United States Patent [19]
Heinz

[11] 3,959,652
[45] May 25, 1976

[54] DEVICE FOR RAY DIAGNOSIS FOR DETERMINING THE DISTRIBUTION OF RADIOACTIVE SUBSTANCES

[75] Inventor: Lothar Heinz, Erlangen-Bruck, Germany

[73] Assignee: Siemens Aktiengesellschaft, Munich, Germany

[22] Filed: May 16, 1973

[21] Appl. No.: 360,826

[30] Foreign Application Priority Data
June 6, 1972 Germany............................ 2227495

[52] U.S. Cl.............................................. 250/363 S
[51] Int. Cl.²......................................... G01T 1/20
[58] Field of Search ........... 250/363, 366, 369, 368, 250/363 S

[56] References Cited
UNITED STATES PATENTS

| | | |
|---|---|---|
| 3,678,277 | 7/1972 | Greenspan et al............... 250/369 X |
| 3,683,184 | 8/1972 | Brunnett et al.................. 250/369 X |
| 3,784,818 | 1/1974 | Stoeckel et al..................... 250/368 |
| 3,890,355 | 6/1975 | Brunnett et al...................... 250/366 |

*Primary Examiner*—Davis L. Willis
*Attorney, Agent, or Firm*—V. Alexander Scher

[57] ABSTRACT

A ray diagnosing device for determining the distribution of radioactive substances in a body has a measuring head containing the ray probe, means for moving the head for a scanning line by line of the part to be examined, a setting device for the line distance and a printer actuated by the ray probe for inscribing an image corresponding to the activity distribution upon a writing sheet. The invention is particularly characterized in that the printer has a number of printing keys each of which is made to correspond to a specific line spacing and that there is an adjusting device for selectively switching on and off each one of the keys.

3 Claims, 6 Drawing Figures

DEVICE FOR RAY DIAGNOSIS FOR DETERMINING THE DISTRIBUTION OF RADIOACTIVE SUBSTANCES

This invention relates to a ray diagnosing device for determining the distribution of radioactive substances in a body with a measuring head containing a ray probe, means for moving the head for a line by line scanning of the region to be examined, a setting device for the line spacing and a printer actuated by the ray probe for inscribing upon a writing sheet an image corresponding to the activity distribution.

Ray diagnosing devices of this type are known wherein the printer has a single printing key which prints upon the writing sheets markings extending transversely to the longitudinal direction of the lines. Since only one printing key is used the length of the marking obviously cannot be changed. The length of the marking is so measured that for mostly used line spacings there is no undesirable intermediate space between the individual lines upon the writing sheet. If the line distance is changed, there is a change in the distance of markings of two lines. This is undesirable, however, since in case of too great a distance, it becomes difficult to evaluate the reproduction upon the writing sheet.

An object of the present invention is to improve existing devices.

Another object is to provide a ray diagnosing device of the described type wherein the distance between markings of two adjacent lines always has its best possible amount independent from the selected line distance.

Other objects will become apparent in the course of the following specification.

In the accomplishment of the objectives of the present invention it was found desirable to provide a printer containing a number of printing keys each of which is made to correspond to a specific line spacing and to provide an adjusting device for selectively switching on and off each one of the keys.

In accordance with the present invention when printing keys are used for the printing of markings the lengths of the markings can be adapted to the existing spacing between lines, so that for each line spacing it is possible to provide the best distance of markings of two adjacent lines.

In accordance with an advantageous embodiment of the present invention the printing keys can be selectively set by the adjusting device into a printing position in which they can be coupled to their actuating device.

The invention will appear more clearly from the following detailed description when taken in connection with the accompanying drawings showing by way of example only, a preferred embodiment of the inventive idea.

Figure 1:
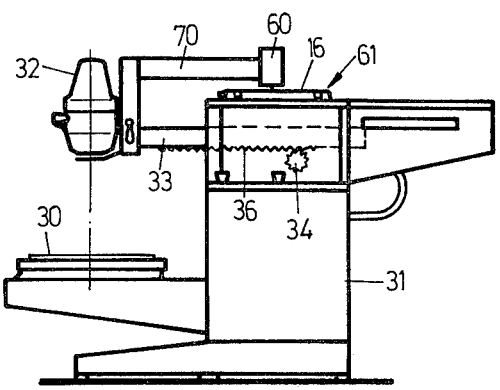
FIG. 1 is a side view of a ray diagnosing device of the present invention.
Figure 2:
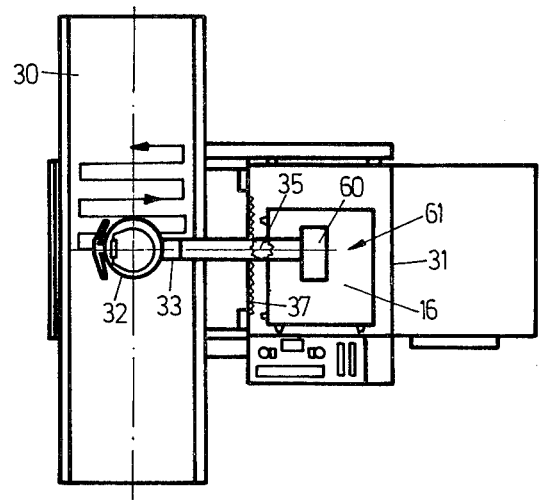
FIG. 2 is a top view of the device shown in FIG. 3

The ray diagnosing device shown in FIGS. 1 and 2 has a support 30 for the patient, the support being attached to a carrier 31 and being adjustable in height. A measuring head 32 which is fixed to an arm 33 is used for scanning an adjustable portion of a patient. The arm 33 extends through the carrier 31. As shown in FIG. 2 the measuring head 32 moves back and forth over the area to be measured. A line motor 34 and a step motor 35 are used for the moving of the measuring head 32. The line motor 34 engages with a pinion a toothed rod 36 at the arm 33 and the step motor engages with a pinion a toothed rod 37 at the carrier 31. The line motor 34 is fixed to the carrier 31 and the step motor is fixed to the arm 33.

Figure 3:
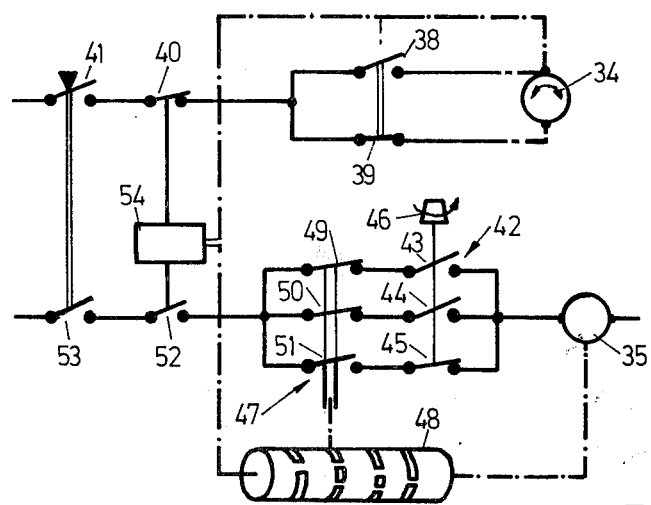
FIG. 3 is a circuit diagram showing switches for moving the measuring head of the device of FIGS. 1 and 2.

As shown in FIG. 3 the line motor 34 is fed by a pole reversing switch consisting of two switches 38 and 39. The switches 38 and 39 are mechanically connected with each other in such manner that only one of them is closed at any time. Furthermore, the feed of the line motor 34 takes place through a switch 40 and a main switch 41.

The step motor 35 is fed by a step selector 42 which in the illustrated embodiment includes three switches 43 to 45 which are actuated by a button 46 corresponding to the desired step length. In front of the step selector 42 there is connected a step giver 47 consisting of a switch shaft 48 and three switches 49 to 51. In front of the switches 49 to 51 there are located a switch 52 and a main switch 53 which is actuated with the main switch 41 for switching on the apparatus. A device 54 is used to make certain that the measuring head 32 will move according to program following the varying lines shown in FIG. 2.

FIG. 3 is based on the assumption that in the step selector 42 the switch 45 is closed corresponding to a step length and thus to a line distance of 2.5 mm. In the starting position of the measuring head 32 the switch 40 is initially closed by the device 54. After the closing of the main switch 41, 43 the line motor 34 starts and moves the measuring head 32 up to the end of the line. In the end position the switches 38, 39 which are constructed as end switches, are switched over, namely, the switch 39 is opened and the switch 38 is closed. At the same time the switch 40 is opened by the device 54 and the line motor 34 is stopped. Thus the device 54 receives a signal indicating the end of the line.

The device 54 now closes the switch 52 so that the step motor 35 is supplied with voltage through switches 51 and 45 and carries out the desired step of 2.5 mm. At the end of this step the switch shaft 48 which is driven by the step motor 35, will cause the opening of the switch 51 and thus will stop the step motor 35. This stop is also signalized to the device 54 which will open again the switch 52 and close the switch 40. The line motor 34 will now run opposite to its previous direction. The described procedure is periodically repeated until the desired area being measured is completely scanned.

In the illustrated embodiment the switches 43 and 44 can be set to two other line spaces and thus to step lengths of 3.3 mm and 5 mm. The lengths of steps are fixed in that the switches 49 to 51 are influenced by different switching paths of the switch shaft 48 through actuating members. Thus the swich shaft 48 is made to correspond to the desired step lengths.

FIGS. 1 to 3 show that by means of the step selector 42 it is possible to set three different step lengths for the step motor 35 and thus three different line spacings for the reciprocating movement of the measuring head 32.

Figure 4:
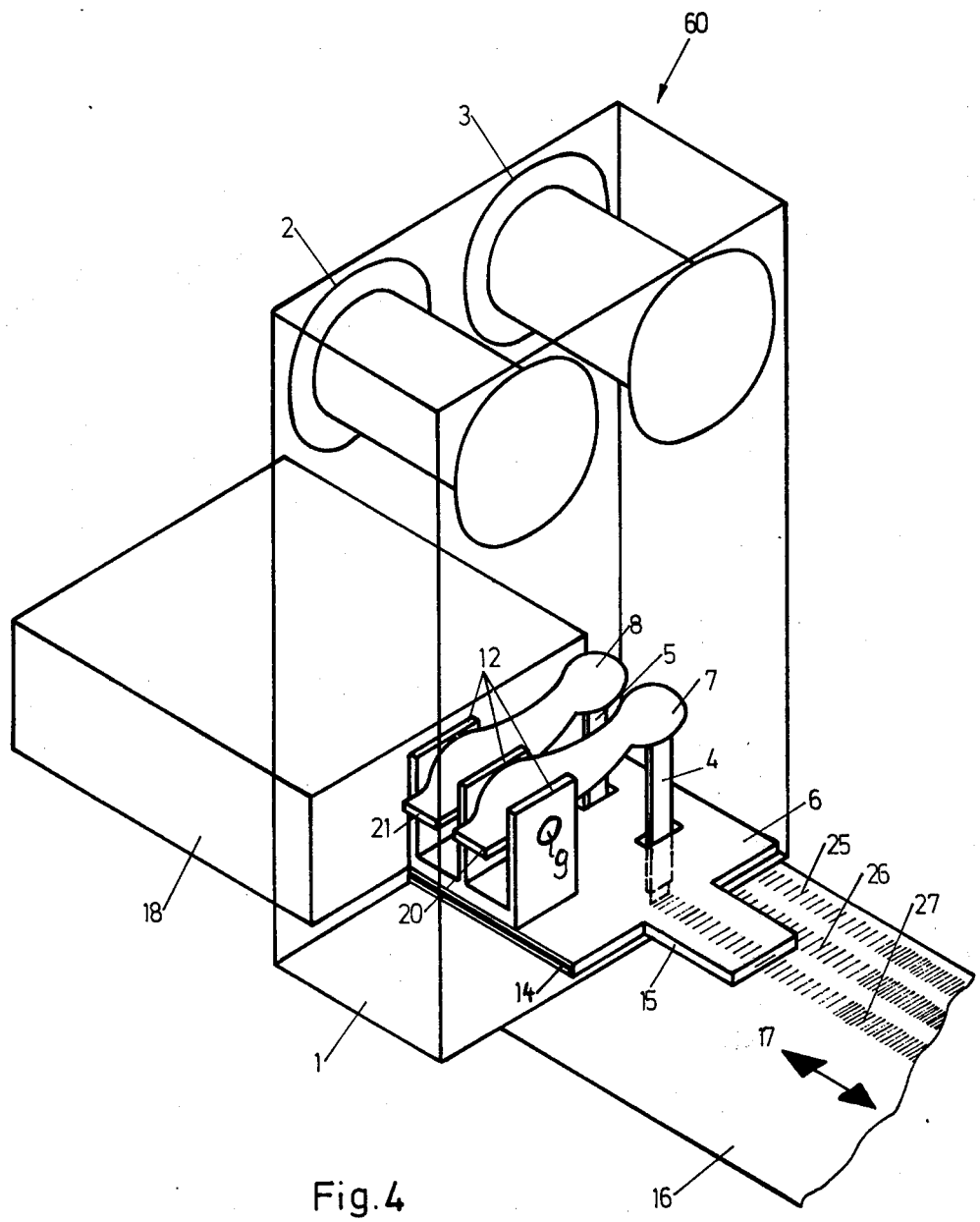
FIG. 4 is a perspective view of a printer for the ray diagnosing device of the present invention.
Figure 5:
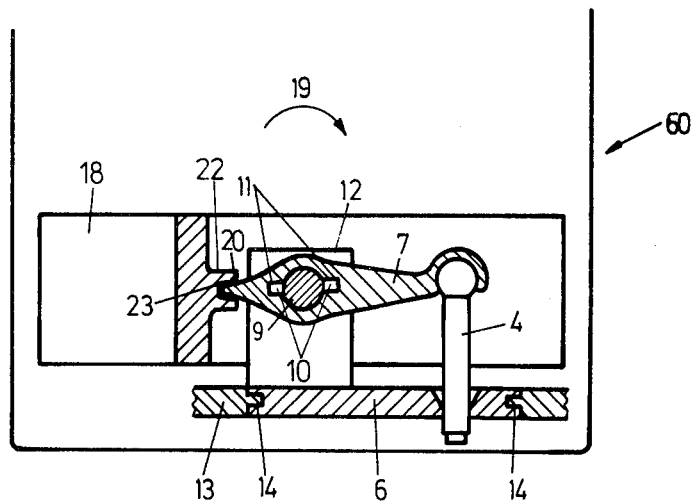
FIG. 5 is a section along the line II — II of FIG. 6 through the part of the printer containing the printing keys.
Figure 6:
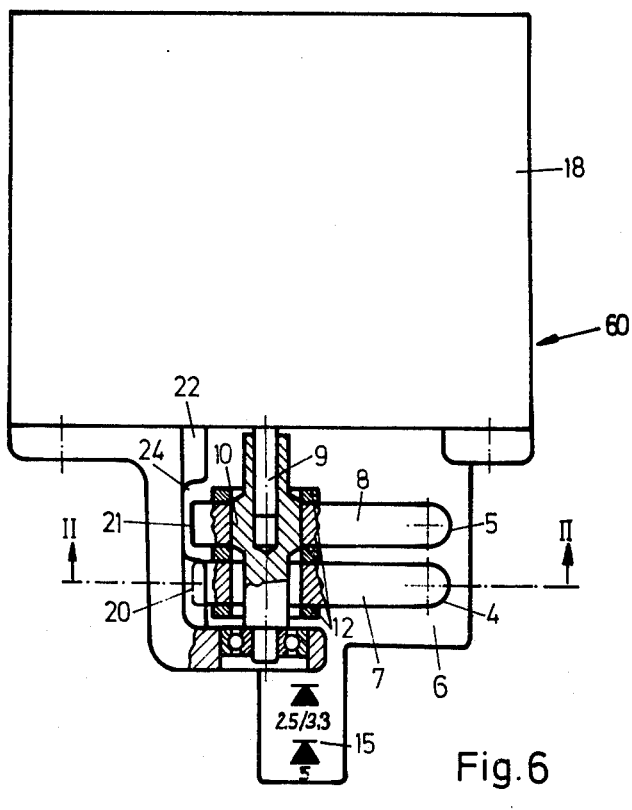
FIG. 6 is a top view, partly in section, of the part of the printer shown in FIG. 5.

The printer shown in FIGS. 4 to 6 which is movable in synchronism with the measuring head 32 includes, as is known, a holder 1 which has two color band rollers 2 and 3. The color band wound upon the rollers 2 and 3 is moved past two printing types 4 and 5 by suitable means not shown in the drawings. As shown in FIG. 5 the types 4 and 5 are longitudinally movable in a supporting plate 6 and have upper ball-shaped ends supported in corresponding recesses of two actuating levers 7 and 8. The levers 7 and 8 are carried by a shaft 9 and are longitudinally movable thereon. As shown in FIG. 6 the shaft 9 in the printing position has a catch 10 to which can be connected the levers 7 and 8 by being correspondingly shifted upon the shaft 9 and by being provided with corresponding recesses. FIG. 5 shows a recess 11 of the actuating lever 7.

A cam 12 firmly connected with the supporting plate 6 and enclosing the levers 7 and 8 is used to shift these levers upon the shaft 9. As shown in FIG. 5, the plate 6 with the cam 12 is shiftable upon a base plate 13 by means of guides 14 in the longitudinal direction of the shaft 9. To carry out this movement the plate 6 has an extension 15 which projects out of the printer and can be actuated by hand. The color band is moved from the roller 2 to the roller 3 and vice versa between the base plate 13 and the supporting plate 6 and a writing sheet 16 shown in FIG. 4. The printer is actuated during the printing in the direction of the arrow 17. The basic plate 13 is not shown in FIGS. 1 and 3 for the clarity of illustration.

The shaft 9 is rotated in a known manner by a magnet 18 to provide printing of the markings upon the writing sheet 16 in the direction of the arrow 19 (FIG. 5). The writing sheet lies upon the upper side 61 of the device. The magnet 18 is actuated in the known manner by the ray probe of the measuring head of the ray diagnosing apparatus.

The actuating levers 7 and 8 have extensions 20 and 21 used to stop the lever which is not being used with the corresponding printing type. For that purpose is provided a fixed ledge 22 having a longitudinal groove 23 (FIG. 5) and a recess 24 (FIG. 6). FIG. 6 shows the actuating lever 6 with the printing type 5 in its printing position in which the projection 21 lies in the recess 24, so that the actuating lever 8 can be swung by the shaft 9 through the catch 10 for printing the markings. The actuating lever 7 is then located in a position in which its extension 20 lies in the groove 23 of the ledge 22. Thus the lever 7 is stopped, although the shaft 9 can freely rotate in this position relatively to this lever. FIG. 4 does not show the ledge 22 for clarity of illustration.

The measuring head 32 of the ray diagnosing apparatus moves in the described manner line by line over the area being examined. A corresponding movement of the printer 60 takes place relatively to the writing sheet 16 (FIGS. 1, 2, 4, 5 and 6). As shown in FIG. 1 the printer 60 is rigidly connected by an angular arm 70 with the arm 33 and thus is moved in synchronism with the measuring head 32. The printer 60 is actuated by the ray measuring probe in the measuring head 32. The printing type 5 located in the printing position inscribes upon the writing sheet 16 markings corresponding to the activity distribution in the area being examined, as shown in FIG. 4. FIG. 4 shows that three lines 25 to 27 have already been inscribed. The distance between the lines 25 and 26, or 26 and 27 corresponds to the distance of the lines tested by the measuring head.

The length between the markings, i.e., the arrangement of the printing types 4 and 5, is so selected that the distance between the lines 25 and 26, and the lines 26 and 27 is sufficiently small so as not to disturb the evaluation of the image inscribed upon the writing sheet 16. In the illustrated embodiment markings having two different lengths can be inscribed by printing types 4 and 5. After selecting the line spacing at the step selector 42 the operator sets the corresponding type by actuating the extension 15. As already stated, FIGS. 5 and 6 show the type 5 in the printing position. If the type 4 is to be moved into the printing position instead of the type 5, the operator will push the extension 15 in the direction of the plate 1 until the actuating lever 8 with its extension 21 lies in the recess 24. Then printing can be carried out with the type 4.

FIG. 6 shows that the extension piece 15 carries a scale which indicates which of the types 4 and 5 is located in the printing position.

Within the scope of the present invention the number of types can be made equal to the number of useable line spacings of the measuring head so that one printing type can correspond to each line distance. In that case it is possible to provide the same distance of markings of two adjacent lines upon the writing sheet 16 for all line spacings of the measuring head. Thus there can be more than two types. However, within the framework of the present invention it is also possible to operate with a number of types which is less than the number of line spacings if one gives up the precisely constant spacing of markings of two adjacent lines upon the writing sheet 16 and is satisfied with only an approximate adaptation of these spacings. The illustrated example is based on such a case. In this example one type is used for line distances 2.5 mm and 3.3 mm and one type for 5 mm.

I claim:

1. A ray diagnosing device, comprising a measuring head with a ray probe, means moving said measuring head for a line by line scanning of a part of a body to determine the distribution of radioactive substances therein, a device for setting the line distance, a printer actuated by the ray probe for printing a representation corresponding to the activity distribution, said printer comprising a plurality of keys, each of said keys corresponding to a specific line spacing, an actuating device operating said keys and comprising a shaft actuated by the ray probe, levers connected with said keys and mounted upon said shaft for longitudinal movement thereon, and a catch carried by said shaft in a printing position and adapted to selectively engage one of said levers, and a setting device moving selectively each key into a printing position in which it is connected to said actuating device and for selectively switching off each of said keys.

2. A ray diagnosing device according to claim 1, wherein said actuating device comprises means for stopping levers which are not engaged by said shaft.

3. A ray diagnosing device according to claim 2, wherein said means for stopping levers comprise a fixed member having a groove and extension pieces carried by said levers and fitting into said groove.

* * * * *